US012777078B2

(12) United States Patent
Donlan

(10) Patent No.: US 12,777,078 B2
(45) Date of Patent: Oct. 27, 2026

(54) LEARNING ACCESS PERMISSIONS TO COMPUTING RESOURCES

(71) Applicant: Truist Bank, Charlotte, NC (US)

(72) Inventor: Matthew Laine Donlan, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 36 days.

(21) Appl. No.: 18/905,211

(22) Filed: Oct. 3, 2024

(65) Prior Publication Data

US 2026/0100973 A1 Apr. 9, 2026

(51) Int. Cl.
*H04L 9/40* (2022.01)
*H04L 41/16* (2022.01)

(52) U.S. Cl.
CPC .............. *H04L 63/20* (2013.01); *H04L 41/16* (2013.01); *H04L 63/102* (2013.01)

(58) Field of Classification Search
CPC ........ H04L 63/20; H04L 41/16; H04L 63/102
USPC .............................................................. 726/1
See application file for complete search history.

(56) References Cited

U.S. PATENT DOCUMENTS

2024/0403428 A1* 12/2024 Lal ........................ G06F 21/566
2025/0023779 A1* 1/2025 Sumedrea ........... H04L 41/0894
2025/0086895 A1* 3/2025 Chan ................... G06F 3/04842
2025/0217775 A1* 7/2025 Garg .................. G06Q 10/1093
2025/0307640 A1* 10/2025 Belgi ................... G06N 3/0895
2025/0310336 A1* 10/2025 Medina ................... H04L 63/20
2025/0350602 A1* 11/2025 Black ...................... H04L 63/20
2025/0363548 A1* 11/2025 Fedoruk .............. G06F 11/3672
2025/0365322 A1* 11/2025 Ananthakrishnan ......................... H04L 63/105
2025/0373615 A1* 12/2025 Harari ................... G06F 21/604
2025/0390481 A1* 12/2025 Cox .................... G06F 16/2272
2025/0390607 A1* 12/2025 Chahal ................ G06F 21/6263

OTHER PUBLICATIONS

Souvika Sarkar; LLMs as On-demand Customizable Service; Arxiv: Year:Jan. 2024; pp. 1-8.*

* cited by examiner

*Primary Examiner* — Monjur Rahim
(74) *Attorney, Agent, or Firm* — Michael A. Springs, Esq.; Shumaker, Loop & Kendrick, LLP; Patrick B. Horne

(57) ABSTRACT

An application executing on a processor may access a permissions database includes permissions data for a plurality of accounts. A large language model (LLM) executing on the processor may analyze, based on the permissions database, a plurality of operations associated with the plurality of accounts. The LLM may determine, based on the analysis, a first operation of the plurality of operations associated with a first account of the plurality of accounts. The LLM may generate, based on the first operation and the permissions data for the first account, modified permissions data for the first account.

20 Claims, 12 Drawing Sheets

LEARNING ACCESS PERMISSIONS TO COMPUTING RESOURCES

BACKGROUND

Permissions in computing environments generally define whether or not an associated account (and/or user) can access a resource. One problem in managing permissions is granting, revoking, or otherwise modifying access rights for accounts. However, conventional solutions for managing permissions are largely manual and limited to existing permissions defined in software. Conventional permissions management solutions are therefore unable to consider the various processes, workflows, and general operations of an organization. As such, organizations and their systems may be susceptible to authorization errors, security breaches, permissions violations, and other undesirable outcomes.

BRIEF SUMMARY

Embodiments of the present disclosure address the above needs and/or achieve other advantages by providing apparatuses and methods that automate permissions management by learning access permissions.

In various embodiments, a method can be performed where an application on a processor accesses a permissions database containing data for multiple accounts. A large language model (LLM) then analyzes operations associated with these accounts based on the permissions data. The LLM determines a specific operation related to one of the accounts and generates modified permissions data for that account accordingly.

In another embodiment, instructions stored on a non-transitory computer-readable storage medium can direct a processor to execute similar steps: accessing a permissions database with data for various accounts, analyzing operations associated with these accounts using an LLM, determining a particular operation related to one of the accounts, and generating modified permissions data based on this information.

Additionally, in yet another embodiment, there is an apparatus comprising a processor and memory storing instructions that instruct the processor to perform similar actions: accessing a permissions database with account-related data, analyzing associated operations using an LLM, determining specific operations for individual accounts, and generating modified permissions data based on these findings.

The features, functions, and advantages that have been discussed may be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
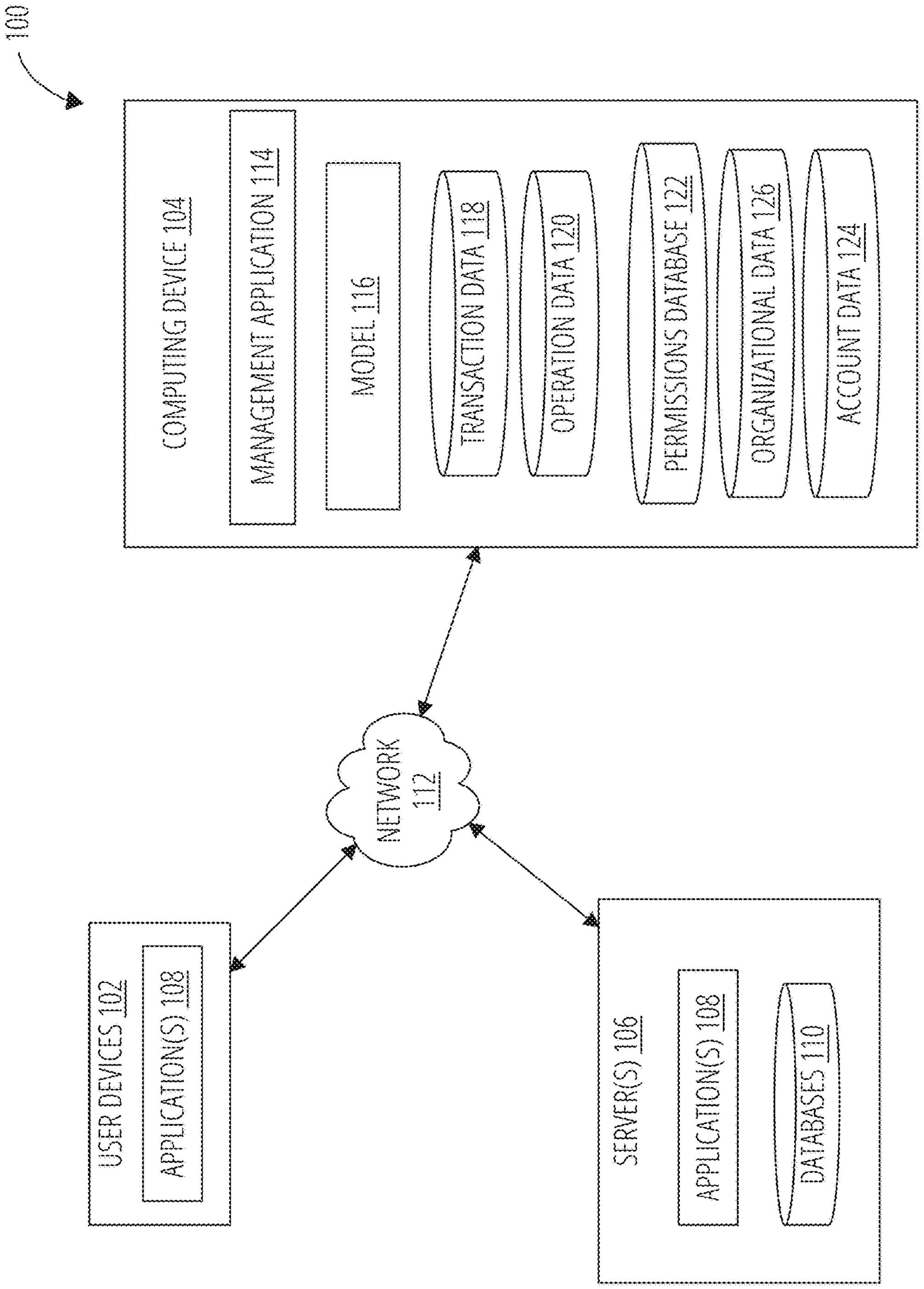

Having thus described embodiments in general terms, reference will now be made to the accompanying drawings, wherein:

FIG. 1 illustrates an aspect of the subject matter in accordance with one embodiment.

Figure 2:
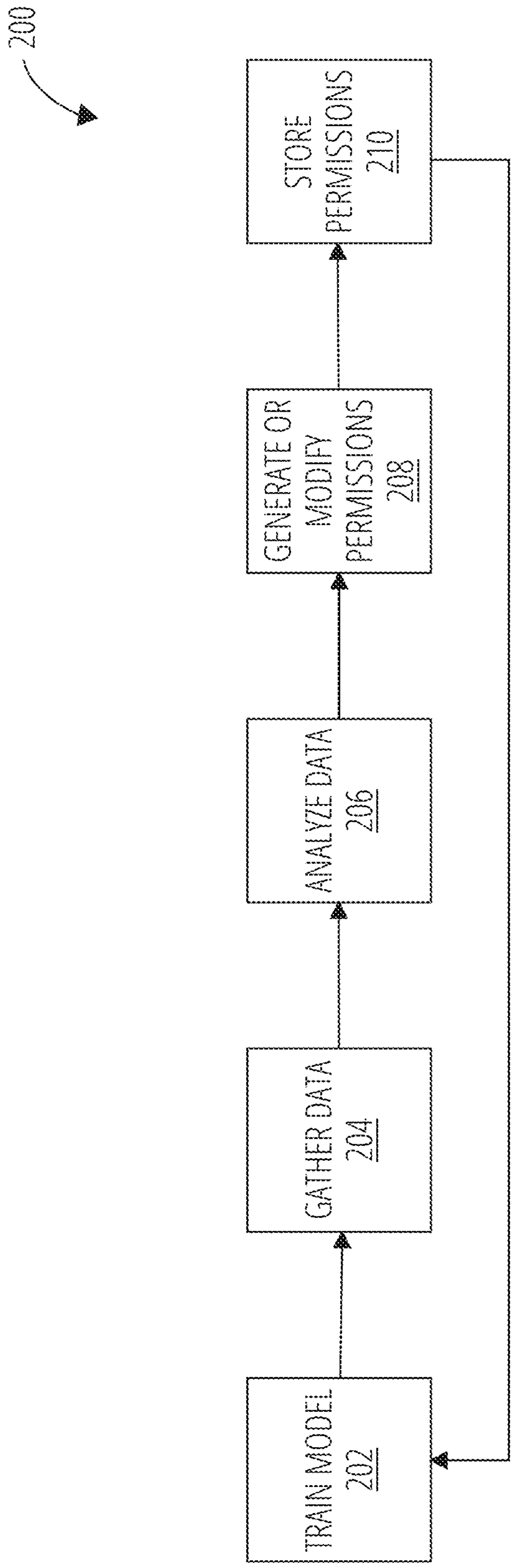

FIG. 2 illustrates an aspect of the subject matter in accordance with one embodiment.

Figure 3:
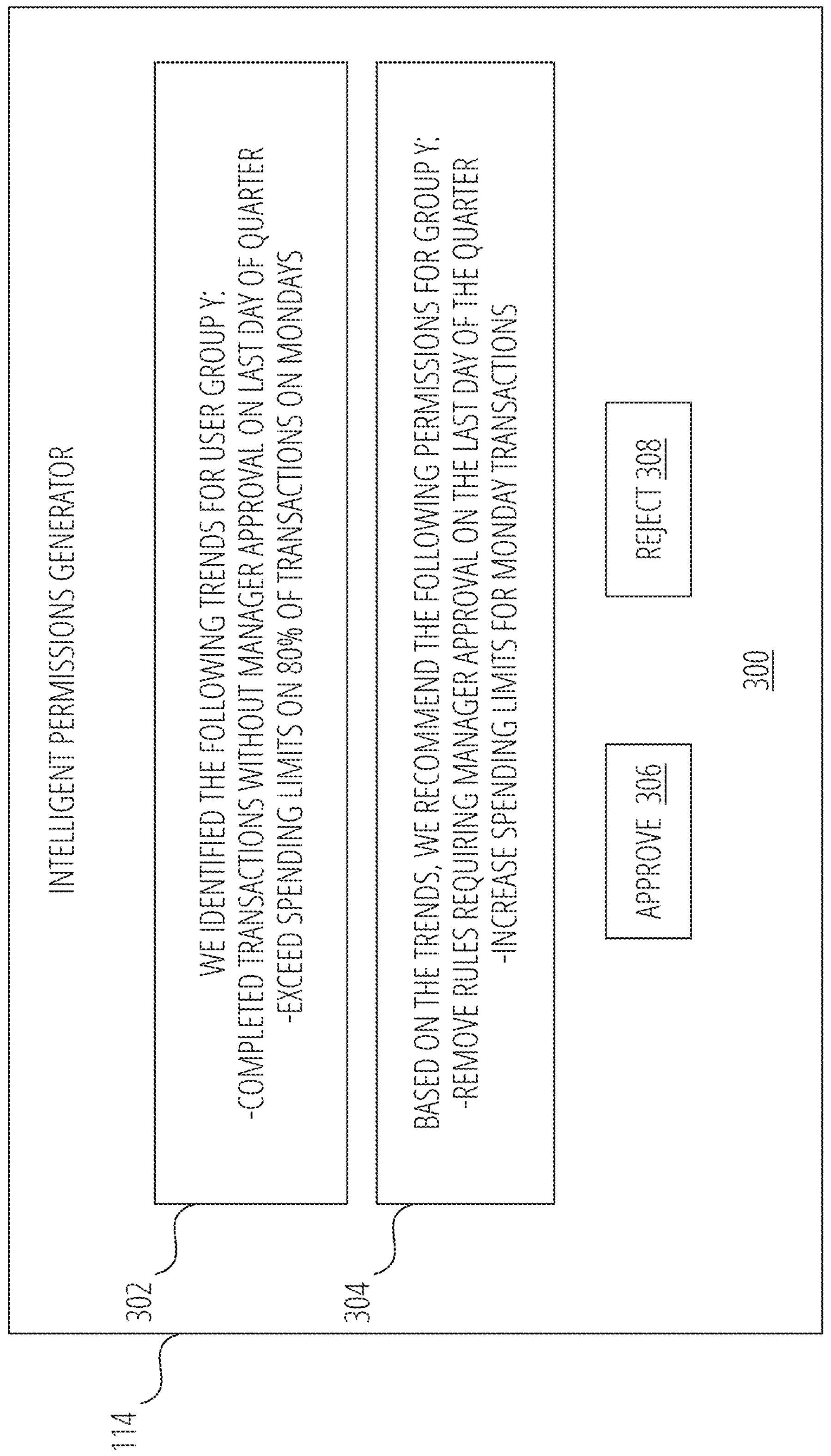

FIG. 3 illustrates an aspect of the subject matter in accordance with one embodiment.

Figure 4:
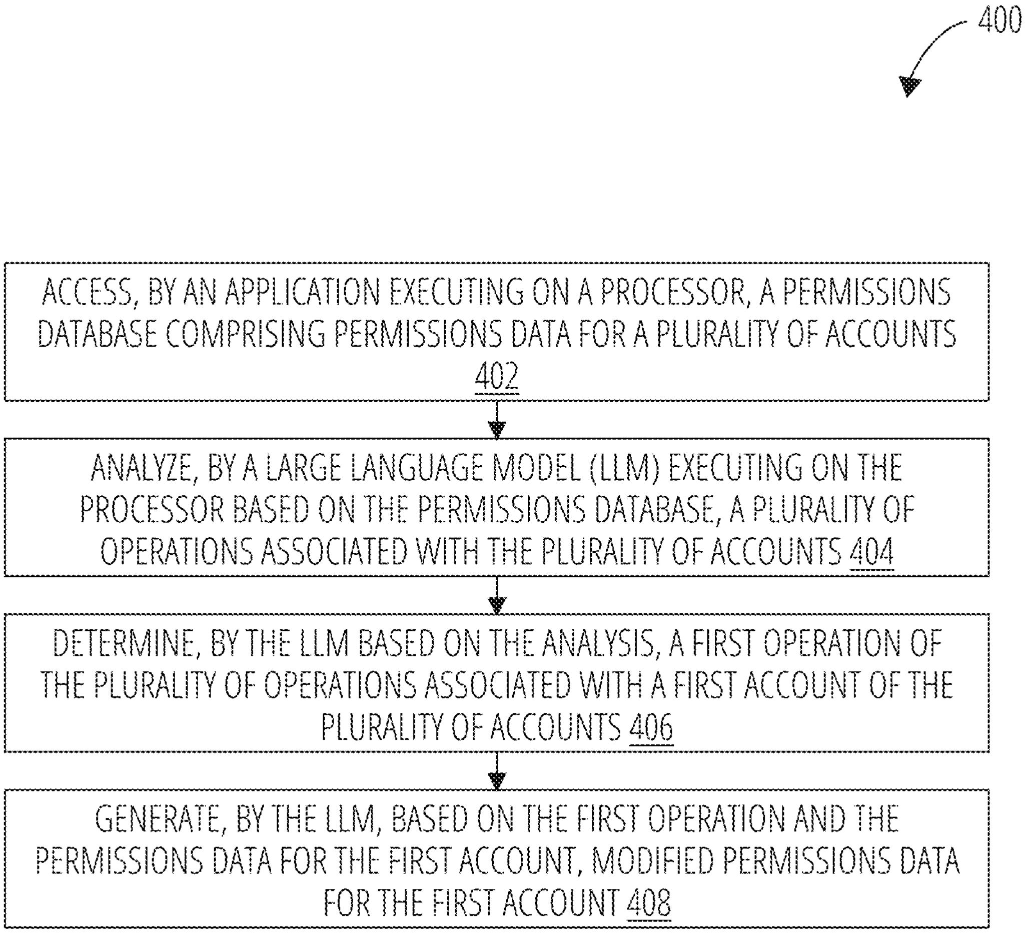

FIG. 4 illustrates a logic flow 400 in accordance with one embodiment.

Figure 5A:
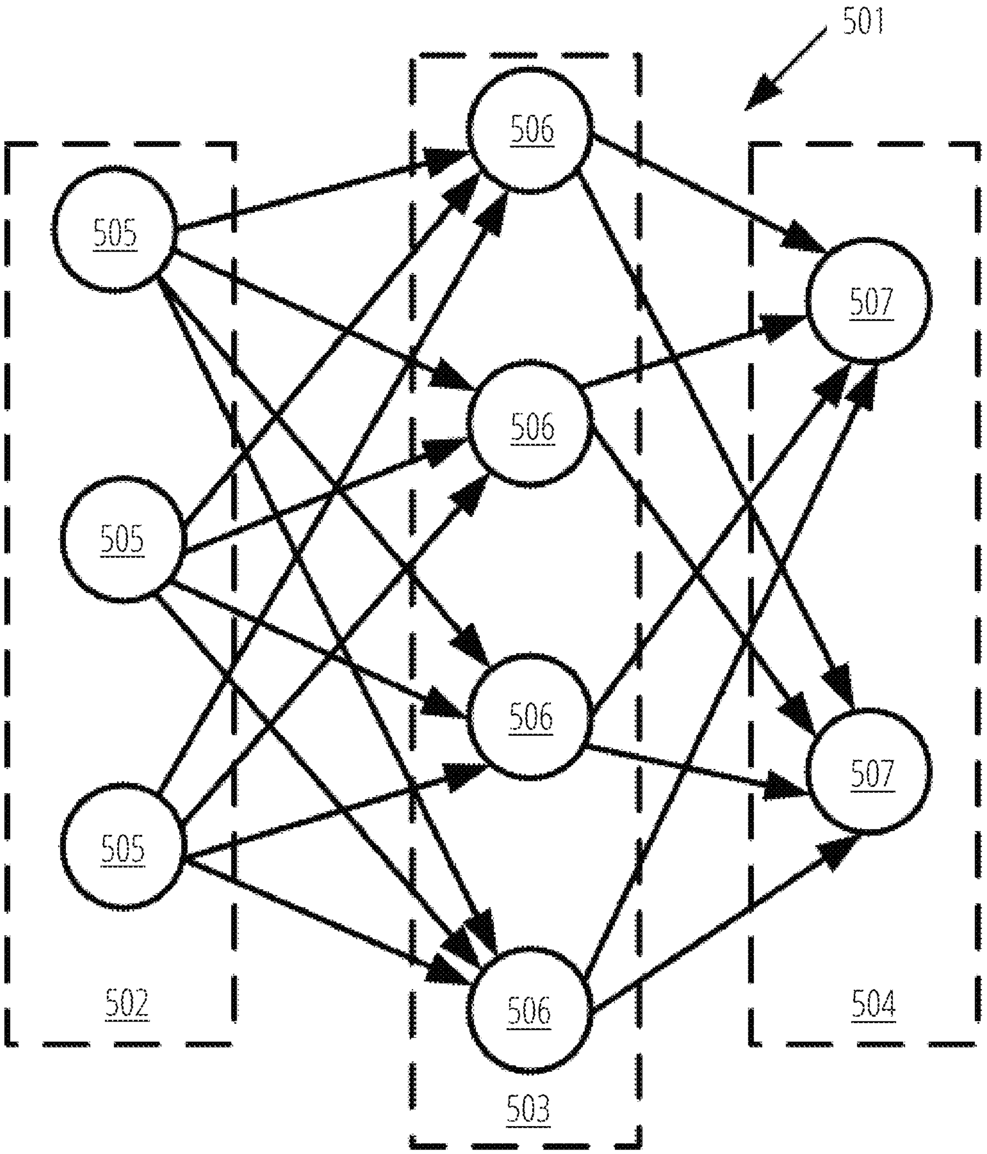

FIG. 5A is a diagram of a feedforward network, according to at least one embodiment, utilized in machine learning.

Figure 5B:
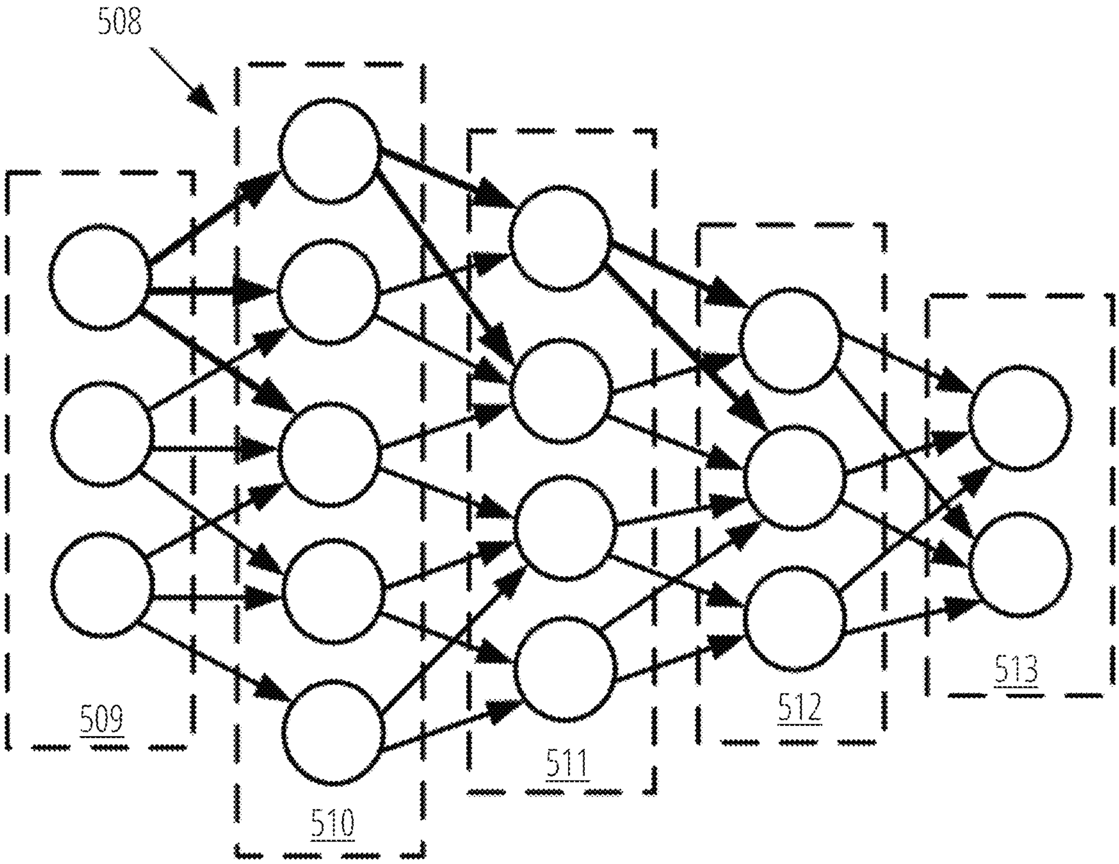

FIG. 5B is a diagram of a convolutional neural network, according to at least one embodiment, utilized in machine learning.

Figure 5C:
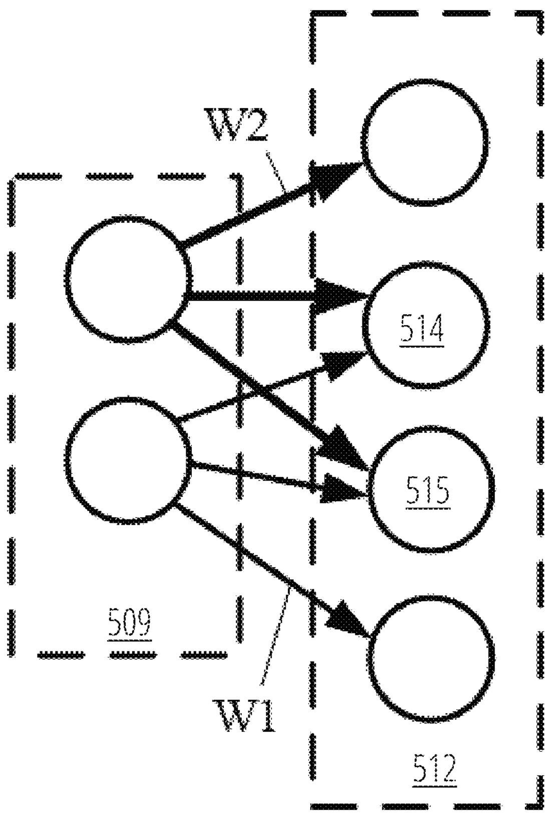

FIG. 5C is a diagram of a portion of the convolutional neural network of FIG. 5B, according to at least one embodiment, illustrating assigned weights at connections or neurons.

Figure 6:
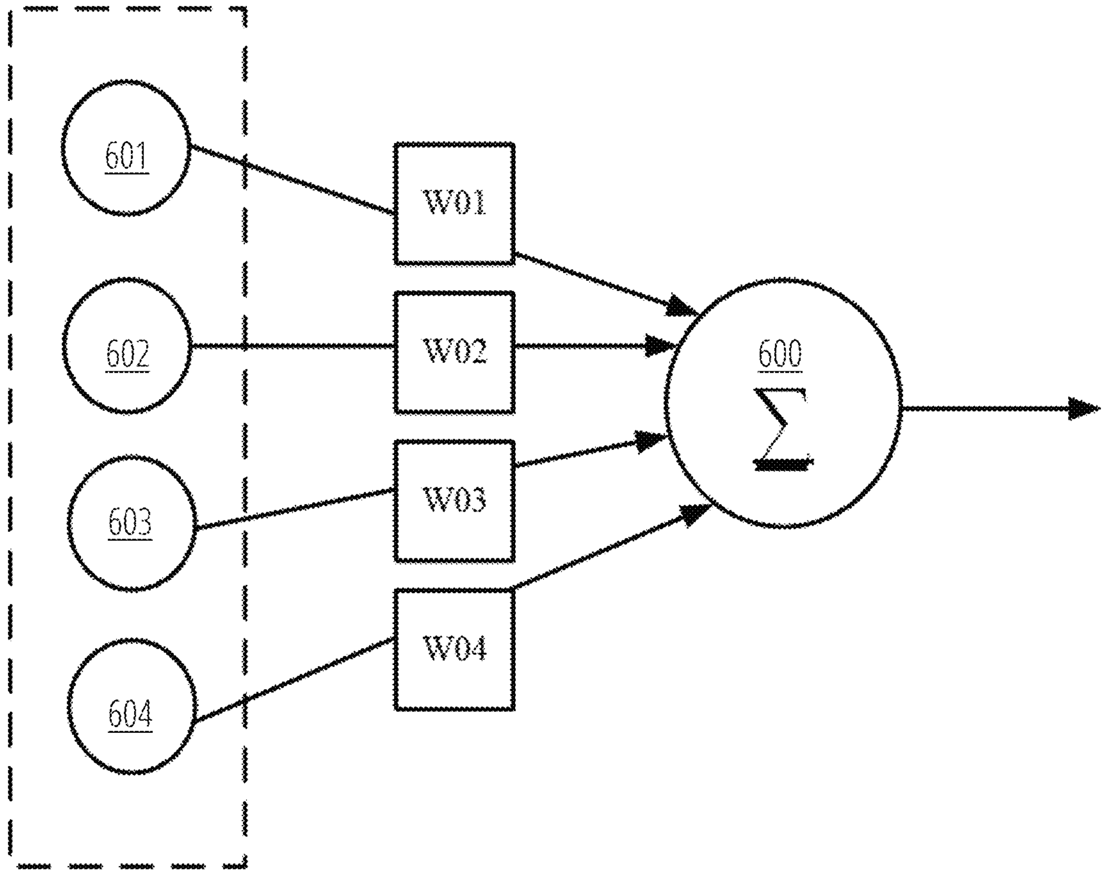

FIG. 6 is a diagram representing an exemplary weighted sum computation in a node in an artificial neural network.

Figure 7:
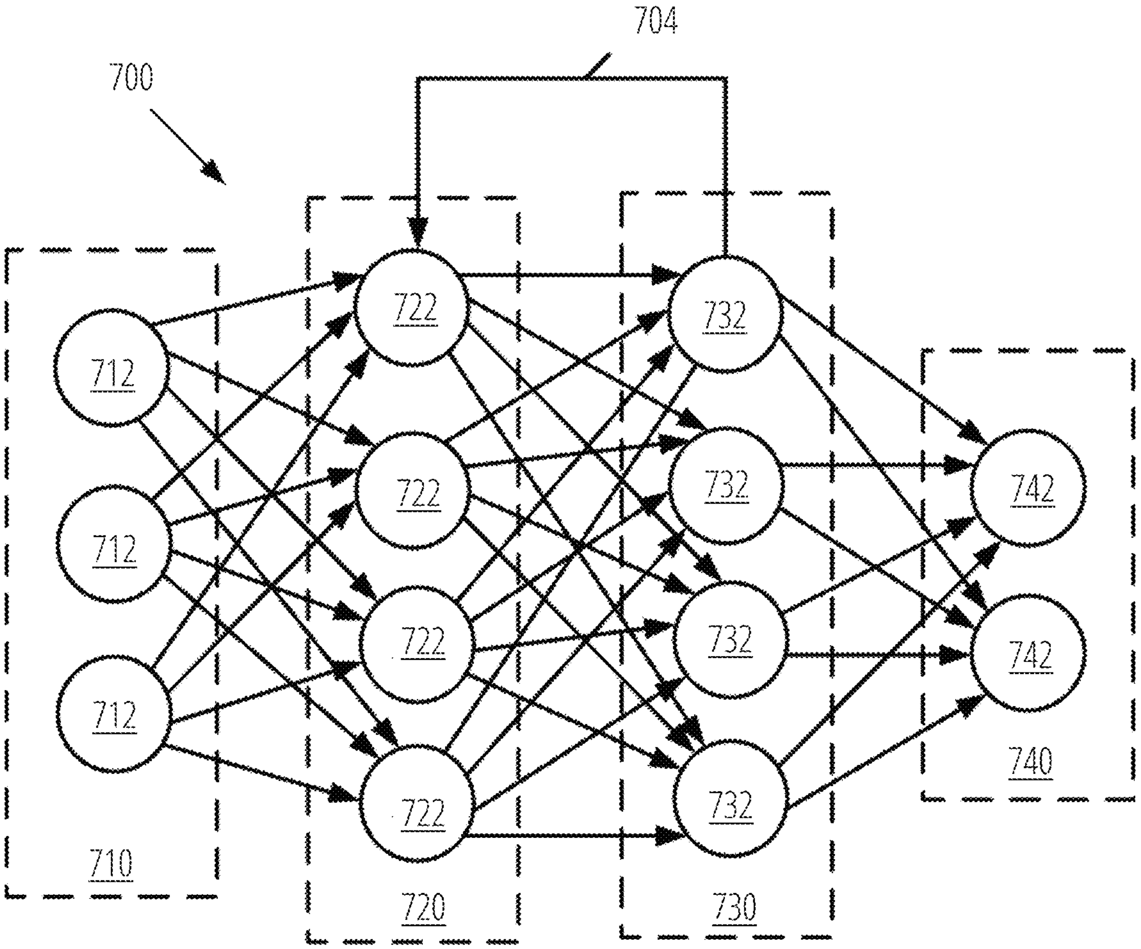

FIG. 7 is a diagram of a Recurrent Neural Network (RNN), according to at least one embodiment, utilized in machine learning.

Figure 8:
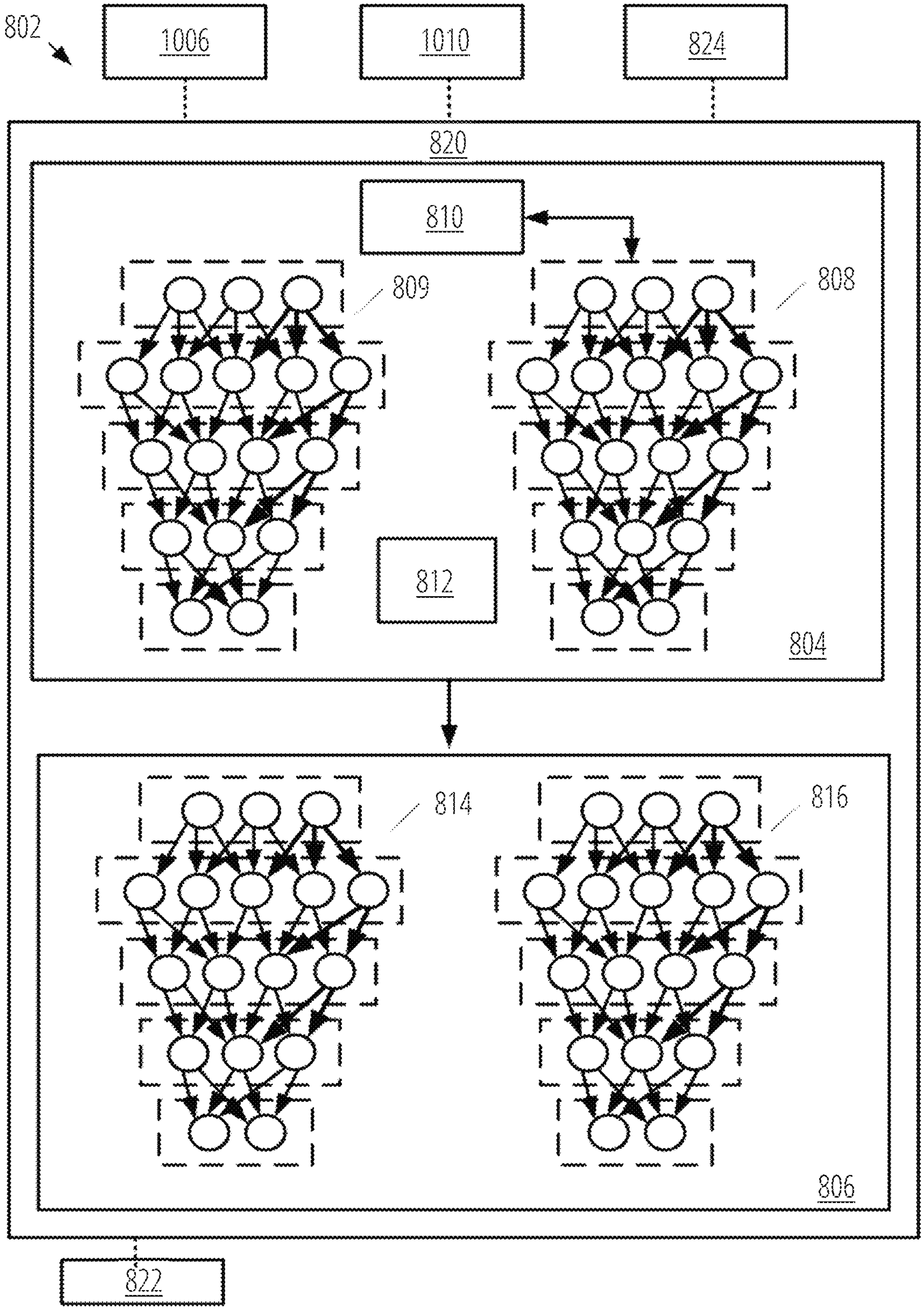

FIG. 8 is a schematic logic diagram of an artificial intelligence program including a front-end and a back-end algorithm.

Figure 9:
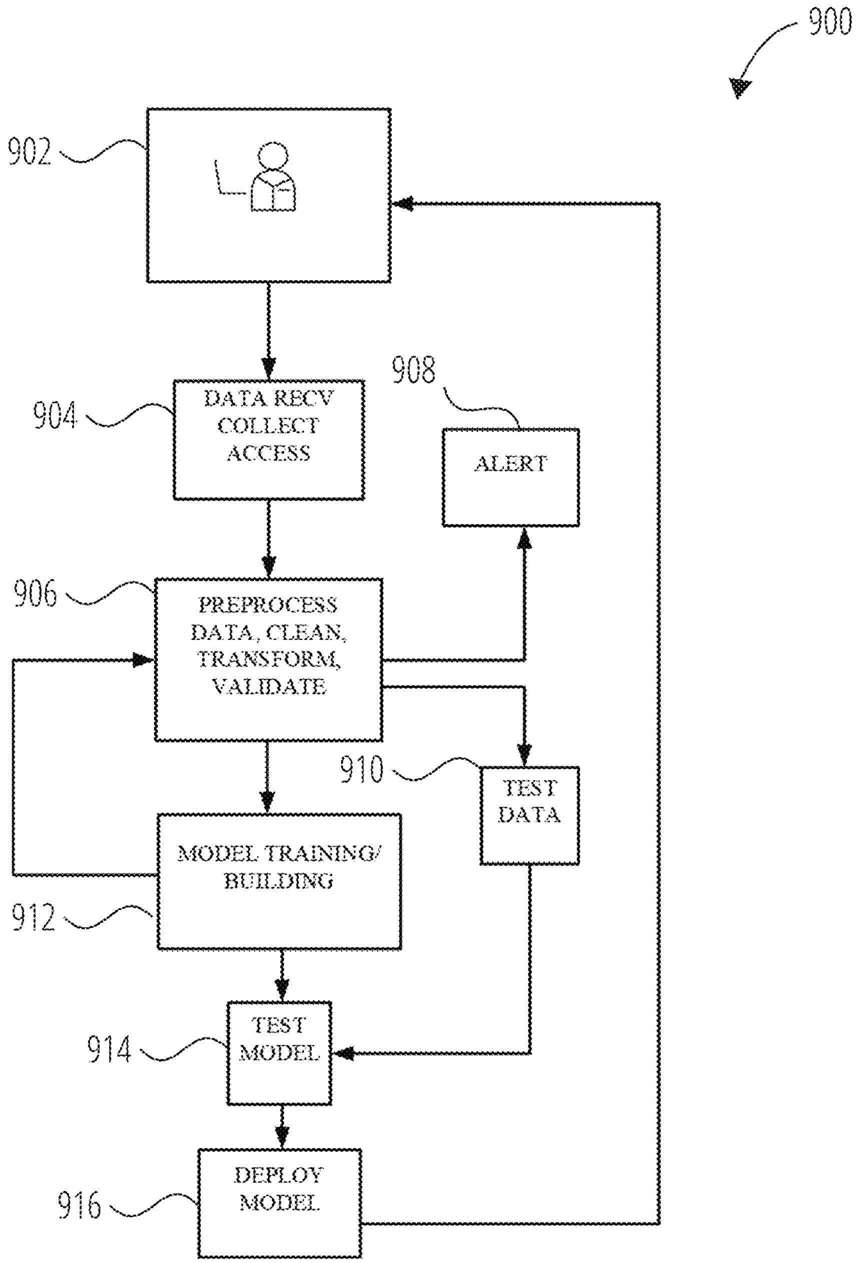

FIG. 9 is a flow chart representing a method, according to at least one embodiment, of model development and deployment by machine learning.

Figure 10:
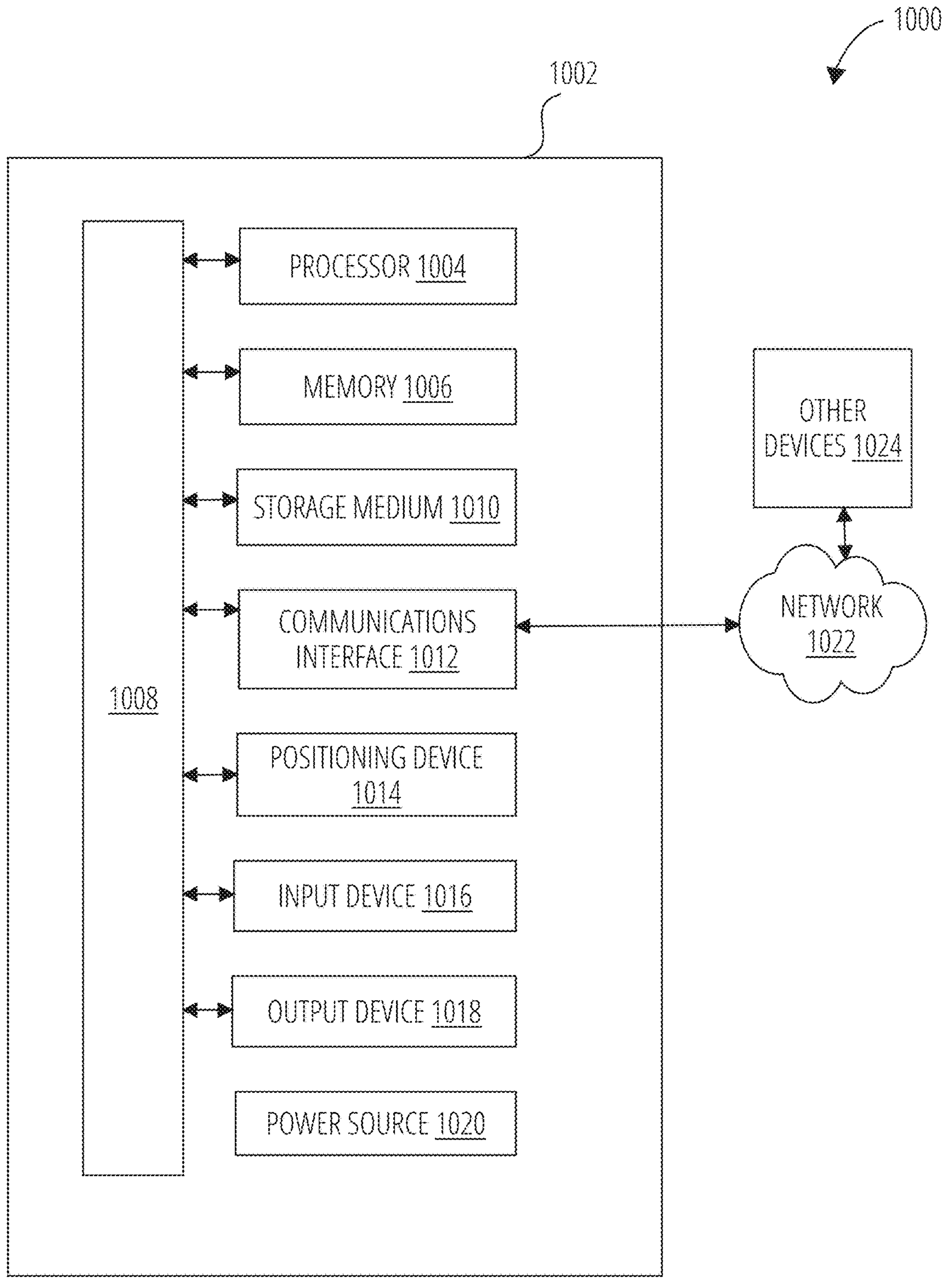

FIG. 10 illustrates a computing system 1000, in accordance with one embodiment.

DETAILED DESCRIPTION

Embodiments disclosed herein are directed to learning access permissions (also referred to as "entitlements") within a domain. The permission may be related to any type of system component or operation, such as accessing applications, using functions within an application, making purchases, transferring funds, accessing databases, etc. The system domain may be associated with any organization, such as a business, financial institution, educational institution, government institution, etc. Generally, embodiments disclosed herein may collect data associated with the entity, such as transaction data, operations performed using permissions, organizational hierarchies, workflows, rules, processes, etc. The collected data may be analyzed to determine trends, relationships, patterns, etc., in the organization. Based on the analysis, new and/or updated permissions may be generated. For example, permissions may be granted, revoked, or otherwise modified.

For example, a computing model such as a LLM may analyze the collected data to determine trends, relationships, patterns, etc., in the data. The LLM may determine that a group of users have permissions to make purchases under $1M but must receive approval from a manager to make purchases over $1. However, the LLM may determine, based on the transactions processed by the users, that these users make purchases of over $1M without manager approval on the last day of a fiscal quarter. Therefore, the LLM may determine to modify an existing permission (and/or create a new permission) in a permissions database to allow the group of users to make purchases between $1-$10M without manager approval on the last day of a fiscal quarter. Embodiments are not limited in these contexts.

Advantageously, embodiments disclosed herein automate permissions management in computing domains. By collecting and analyzing data within an organization, embodiments disclosed herein may accurately identify trends in how the organization runs or otherwise operates. Based on the analysis and trend identification, embodiments disclosed herein may programmatically generate permissions for various users (or groups of users). These permissions may be implemented within the organization to have permissions that reflect the trends of the organization. Doing so improves the security of all data, applications, hardware resources, funds, etc., in an organization by ensuring proper access controls are implemented in the organization. Furthermore, doing so improves the performance of computing systems by allowing permissions management systems (also referred to as access control systems) to generate new types of permissions that are based on the specifics of a given organization. For example, conventional systems are limited to rigid, hard-coded permissions. Advantageously, embodiments disclosed herein may generate any number and types of permissions, including permissions that contravene existing permissions (but comply with the trends of the organization). As another advantage, embodiments disclosed herein may ensure that all users, resources, etc., in an organization have current permissions in place, which improves overall system security. Embodiments are not limited in these contexts.

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the disclosure and enable one of ordinary skill in the art to make, use, and practice the disclosure.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

FIG. 1 illustrates an example system that automates permissions management by learning access permissions, according to one embodiment. The system 100 may be associated with an organization, such as a business, financial institution, educational institution, government institution, etc. As shown, the system 100 comprises one or more user devices 102, one or more computing devices 104, and one or more servers 106 communicably coupled via one or more networks 112. The user devices 102, computing devices 104, and/or servers 106 are representative of any type of physical and/or virtualized computing system. For example, the user devices 102, computing devices 104, and/or servers 106 may be implemented as servers, workstations, laptops, mobile devices, smartphones, tablet computers, mainframes, distributed computing systems, compute clusters, media devices, cameras, gaming devices, system-on-chips (SoCs), televisions, wearable devices, virtual machines (VMs), or any other device with processing capabilities.

As shown, the servers 106 may execute, host, or otherwise store one or more applications 108 and one or more databases 110. Similarly, the user devices 102 may execute, host, or otherwise store one or more of the applications 108. The applications 108 of the servers 106 may be the same as or different than the applications 108 of the user devices 102. In some embodiments, the user devices 102 store instances of the databases 110. In some embodiments, the computing device 104 is one of the servers 106, and therefore may host, execute, or otherwise store applications 108 and/or databases 110. The user devices 102, servers 106, and/or computing devices 104 may further include other components not depicted for the sake of clarity (e.g., operating systems, processors, memory, application programming interfaces (APIs), services, microservices, etc.).

The applications 108 are representative of any number and type of application. For example, the applications 108 may include web browsers, account management applications, mobile P2P payment system client applications, applications provided by financial institutions, financial applications, payment applications, Automated Clearing House (ACH) applications, FedNow payment applications, real-time payments (RTP) applications, monetary transfer applications, mobile wallet applications, accounting applications, payment processing frameworks, etc. Although depicted as applications, the applications 108 may are representative of any type of executable code, such as services, microservices, application programming interfaces (APIs), etc. Regardless of the type of a given applications 108, in some embodiments, the applications 108 may include features to process at least a portion of a transaction. The transactions may include purchases, payments, equity transactions, cryptocurrency sales, or any type of transaction. Furthermore, a given transaction may be processed at least in part by multiple portions of one or more applications 108.

The databases 110 are representative of any type of database, such as account databases for customer accounts, databases for payment accounts, production databases for applications, financial institution databases, databases for cached data, and databases for files such as those for user accounts, user profiles, account balances, and transaction histories, files downloaded or received from other devices, and other data items and the like. Example accounts include a checking account, a savings account, a money market account, a certificate of deposit, a mortgage or other loan account, a retirement account, a brokerage account, or any other type of account. In some embodiments, the databases 110 include the permissions database 122, transaction data 118, operation data 120, account data 124, and/or the organizational data 126.

As shown, the computing device 104 includes a management application 114, a model 116, a permissions database 122, a transaction data 118, an operation data 120, an account data 124, and an organizational data 126. The management application 114 is generally configured to control and monitor access to resources within an organization, e.g., within the system 100 of an organization. The management application 114 may manage which users and/or accounts have access to specific data, applications, operations, and systems, ensuring that the right users have the appropriate permissions while maintaining security and compliance. For example, the management application 114 may manage permissions for the application 108, the databases 110, servers 106, network 112, computing devices 104, or any component thereof. Similarly, the management application 114 may manage permissions for types of operations, e.g., purchases, payments, resource management, etc.

In some embodiments, the management application 114 may store the permissions in the permissions database 122. The permissions database 122 may generally include access rights and permissions across various resources within an organization, e.g., the system 100. A given entry (or group of entries) in the permissions database 122 may define which users or groups have specific rights to access, modify, or interact with data, applications, and services. Similarly, one or more entries in the permissions database 122 may define which users or groups have specific rights to perform operations. For example, one or more entries in the permissions database 122 may specify user X has permissions to submit payments using one or more of the applications 108 from 9 AM-5 PM Monday-Friday where the total payment is less than $750,000. As another example, the permissions database 122 may include one or more entries indicating user X must obtain approval from user Y to submit payments where the total is greater than $750,000. In some embodiments, an entry in the permissions database 122 may specify one or more accounts, one or more resources and/or operations, one or more permissions levels (e.g., "low", "medium", and "high", integers on a scale from 0-10, etc.), and one or more rules and/or thresholds. In some embodiments, entries in the permissions database 122 indicate parameters for accessing resources and/or performing operations. For example, an entry in the permissions database 122 may specify that administrator privileges are required to access an operating system features of a server 106. As another example, an entry in the permissions database 122 may specify that users in the accounting department are permitted to access an accounting application 108. As yet another example, an entry in the permissions database 122 may specify a default transaction threshold of $1,000 for all employees (unless other permissions are expressly defined in the permissions database 122). In some embodiments, entries in the permissions database 122 may include textual descriptions of the entry, e.g., to facilitate training of the model 116 and/or to allow the model 116 to generate new and/or modified entries in the permissions database 122. Embodiments are not limited in these contexts.

More generally, the management application 114 or other components of the system 100 may be configured to receive a request to perform an operation. The operation may be any type of operation, such as accessing a feature of an application 108, accessing one or more databases 110, using the network 112, etc. The management application 114 may permit or deny the requested operation based on the permissions database 122. For example, if user X attempts to submit a payment of $250,000 on Monday at 1 PM, the management application 114 may approve the request based on the permissions database 122. In some embodiments, therefore, each entity in the system 100 may include an instance of the management application 114 and the permissions database 122. For example, a server 106 or an application 108 may include respective instances of the management application 114 and the permissions database 122. In some embodiments, the entities in the system 100 may interface with the instance of the management application 114 on the computing device 104. For example, an application 108 may have a plugin or other code that facilitates permissions management communications with the management application 114. Embodiments are not limited in these contexts, as any scheme may be used to implement permissions management in the system 100.

The transaction data 118 is a data store including metadata attributes describing transactions associated with the organization. For example, the transaction data 118 may include records for purchases, payments, receipt of funds, sales, etc. In some embodiments, entries in the transaction data 118 are generated programmatically. For example, if a user submits a payment using an application 108, the application 108 may generate and store an indication of the payment in the transaction data 118. As another example, if the management application 114 approves a request to process a payment from the application 108, the management application 114 may store an indication of the payment in the transaction data 118. In addition and/or alternatively, entries may be manually added to the transaction data 118. A given entry in the transaction data 118 may include a time of the transaction, a type of the transaction, at least one of the plurality of accounts associated with the transaction (e.g., a user account), an amount of the transaction, and any resources used to process the transaction. For example, an entry in the transaction data 118 may specify that user X performed a payment transaction for $7,000 using an application 108. The entry may specify that the transaction was initiated after receiving approval from manager Y via the application 108. Embodiments are not limited in these contexts.

The operation data 120 may be a log of operations (and associated metadata attributes) performed by users associated with an organization. For example, the operations may include accessing resources in the system 100 (e.g., executing an application 108, accessing a database 110, using a function of an application 108, etc. In some embodiments, entries in the operation data 120 are generated programmatically. For example, if a user accesses an application 108, the application 108 may generate and store an indication of the access in the operation data 120. As another example, if the management application 114 approves an access request from the application 108, the management application 114 may store an indication of the access request in the operation data 120. In addition and/or alternatively, entries may be manually added to the operation data 120. A given entry in the operation data 120 may include at a time of the operation, a type of the operation, at least one of the plurality of accounts associated with the operation (e.g., a user account), and any resources used to process the operation. For example, an entry in the operation data 120 may indicate that a user accessed an account balance page of one of the applications 108. Embodiments are not limited in these contexts.

The organizational data 126 may include any other type of data (and associated metadata attributes), such as employee records (e.g., start date, departure date, etc.), customer information, work schedules, vacation schedules, human resources (HR) hierarchies, events, or any other data describing an organization. For example, the organizational data 126 may include events as the organization operates over time. In some embodiments, entries in the organizational data 126 are generated programmatically. For example, if a new employee enrolls in healthcare benefits using an application 108, the application 108 may store an indication of the enrollment in the organizational data 126. As another example, if the management application 114 approves an access request from the application 108 to submit the benefit enrollments, the management application 114 may store an indication of the access request in the organizational data 126. In addition and/or alternatively, entries may be manually added to the organizational data

126. A given entry in the organizational data 126 may include a time of the entry, a type of the entry (e.g., an event, operation, occurrence, etc.), at least one of the plurality of accounts associated with the entry (e.g., a user account), and any resources used in association with the entry. One example of any entry in the organizational data 126 may reflect that payroll was missed on a specific date. For example, a payroll application 108 may indicate that the payroll event was missed, and store an indication of the missed payroll in the organizational data 126. Embodiments are not limited in these contexts.

The account data 124 includes metadata describing a plurality of user accounts within the system 100. In some embodiments, an entry in the account data 124 includes a unique identifier (ID), a username, name, email address, role (e.g., "administrator"), account status (e.g., active, inactive, etc.), creation date, etc. The unique ID for an account in the account data 124 may be used as indices for one or more of the entries in the permissions database 122.

The transaction data 118, operation data 120, permissions database 122, account data 124, and/or organizational data 126 may be updated to include new entries as the organization continues to operate. For example, the management application 114, a user, or other component of the system 100 may update the transaction data 118, operation data 120, permissions database 122, account data 124, and/or organizational data 126 as events occur. For example, the transaction data 118 may be updated as transactions are processed, operation data 120 may be updated as operations occur, permissions database 122 may be updated as permissions are changed, account data 124 may be updated as employees are hired or depart, and organizational data 126 may be updated as the organization operates.

The permissions database 122 may further be managed by the model 116. The model 116 is an artificial intelligence (AI) model that is configured to learn and manage the permissions in the permissions database 122. For example, the model 116 may learn new permissions, learn to modify existing permissions, or learn to remove permissions in the permissions database 122. The model 116 may be any type of AI model, such as a machine learning (ML) model, neural network, large language model (LLM), etc. The model 116 may be trained on training data that describes an organization. Examples of training data for an organization therefore include a permissions data (e.g., at least a portion of the permissions database 122), transaction logs (e.g., at least a portion of the transaction data 118), operation logs (e.g., the operation data 120), information for various accounts (e.g., at least a portion of the account data 124 and/or a subset thereof), and other data describing the organization (e.g., at least a portion of organizational data 126).

Training the model 116 may include preprocessing the training data. For example, the training data may be structured and cleaned to ensure consistency. The training data may be annotated to clearly define permissions and associated users, helping the model 116 understand relationships between users, roles, and access rights. The preprocessing may comprise converting the training data into tokens. The training data may also be formatted to emphasize structure, such as using JSON or XML representations.

The training dataset is then used to train the model 116. During training, the model 116 learns patterns and associations within the text, focusing on specific tasks related to permissions management, such as understanding queries about access levels, generating appropriate permission modification commands, generating new permissions, revoking existing permissions, etc. This may include feeding the model 116 training examples that allow the model 116 to learn from labeled examples of access requests, approvals, and modifications to entries in the permissions database 122, improving the ability of the model 116 to generate accurate and context-aware responses.

Once trained, the model 116 may execute to create new permissions in the permissions database 122, modify existing permissions in the permissions database 122, and/or delete or otherwise revoke existing permissions in the permissions database 122. For example, the model 116 may analyze the transaction data 118 and determine that a group of users processes transactions in contravention to one or more permissions and/or rules in the permissions database 122. For example, the model 116 may determine that a user (or group of users) processes transactions without manager approval. In addition and/or alternatively, the model 116 may determine that the user processes transactions having amounts that exceed maximum transaction amount thresholds, that occur at times that are not included in permitted time ranges, etc. In response, the model 116 may generate one or more entries that reflect the actual operation of the organization. For example, the model 116 may create a permission to allow the user to process transactions without manager approval during a limited time period. In addition and/or alternatively, the model 116 may create a permission to authorize the user to make purchases over $1,000,000. In addition and/or alternatively, the model 116 may create a permission to authorize the user to make purchases at any time. In some embodiments, the model 116 returns generated permissions to the management application 114. The management application 114 may store the permissions generated by the model 116 in the permissions database 122. Embodiments are not limited in these contexts.

As another example, the model 116 may analyze the organizational data 126 and determine that the associated organization closes for the final week of the calendar year. Furthermore, the model 116 may analyze the transaction data 118 and determine that transaction volume and/or amount is substantially greater during the week before the final week of the calendar year relative to the remainder of the year. As such, the model 116 may generate a permission which elevates spending permissions to a group of users in the organization. For example, the generated permission may allow accountants to process transactions of any amount in the week before the final week of a calendar year. The generated permission may be stored in the permissions database 122, e.g., as a new and/or modified entry.

As another example, the model 116 may analyze the organizational data 126 to determine that payroll was missed in October because the payroll administrator was sick. Therefore, the model 116 may identify another user account that processed the payroll in early November after the missed deadline, e.g., in the organizational data 126. The model 116 may then generate a permission to allow the another user account to process payroll. The model 116 may return the generated permission to the management application 114, which may store the permission in the permissions database 122.

In some embodiments, the model 116 may return a generated permission to the management application 114, which outputs an indication of the generated permission to a user for approval. The user may modify the generated permission, accept the permission (whether modified or not) for storage in the permissions database 122, and/or reject the generated permission. Embodiments are not limited in these contexts.

In one embodiment, when a user decides to enroll in a mobile banking program, the user downloads or otherwise obtains the mobile banking system client application from a mobile banking system, for example system 100, or from a distinct application server. In other embodiments, the user interacts with a mobile banking system via a web browser application in addition to, or instead of, the mobile P2P payment system client application.

The network 112 may also incorporate various cloud-based deployment models including private cloud (e.g., an organization-based cloud managed by either the organization or third parties and hosted on-premises or off premises), public cloud (e.g., cloud-based infrastructure available to the general public that is owned by an organization that sells cloud services), community cloud (e.g., cloud-based infrastructure shared by several organizations and manages by the organizations or third parties and hosted on-premises or off premises), and/or hybrid cloud (e.g., composed of two or more clouds e.g., private community, and/or public).

The user devices 102 may include automatic teller machines (ATMs) utilized by the system 100 in serving users. In another example, the user devices 102 and/or servers 106 represent payment clearinghouse or payment rail systems for processing payment transactions, and in another example, the servers 106 such as merchant systems or banking systems configured to interact with the user devices 102 during transactions and also configured to interact with the enterprise system 100 (e.g., the servers 106 and/or computing devices 104) in back-end transactions clearing processes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The system 100 can offer any number or type of services and products to one or more users. In some examples, an enterprise system 100 offers products. In some examples, an enterprise system 100 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 100, automated assistance may be provided by the enterprise system 100. For example, automated access to user accounts and replies to inquiries may be provided by enterprise-side automated voice, text, and graphical display communications and interactions. In at least some examples, any number of human agents, can be employed, utilized, authorized or referred by the enterprise system 100. Such human agents can be, as non-limiting examples, point of sale or point of service (POS) representatives, online customer service assistants available to users, advisors, managers, sales team members, and referral agents ready to route user requests and communications to preferred or particular other agents, human or virtual.

Human agents may utilize agent devices (e.g., user devices 102) to serve users in their interactions to communicate and take action. In such embodiments, the user devices 102 can be, as non-limiting examples, computing devices, kiosks, terminals, smart devices such as phones, and devices and tools at customer service counters and windows at POS locations.

FIG. 2 illustrates an example flow diagram 200 for learning access permissions, according to one embodiment. Although the example flow diagram 200 depicts a particular sequence of operations, the sequence may be altered without departing from the scope of the present disclosure. For example, some of the operations depicted may be performed in parallel or in a different sequence that does not materially affect the function of the flow diagram 200. In other examples, different components of an example device or system that implements the flow diagram 200 may perform functions at substantially the same time or in a specific sequence.

At block 202, a model such as model 116 is trained based on training data. The training of the model 116 allows the model to identify trends, patterns, etc., in the operation of an organization and generate permissions to be stored in the permissions database 122. At block 204, data is gathered within an organization. For example, transactions may be added to the transaction data 118, performed (and/or requested but rejected) operations may be added to the operation data 120, permissions may be added, modified, and/or revoked in the permissions database 122, records for users may be added to the account data 124, and the organizational data 126 may be updated as the organization operates.

At block 206, the model 116 may analyze or otherwise process the data gathered at block 204. For example, the model 116 may identify trends, patterns, etc., in the gathered data. As one example, the model 116 may identify operations that occur without requisite permissions in the permissions database 122. At block 208, the model 116 may generate or otherwise modify (e.g., change, delete, etc.) permissions. For example, the model 116 may generate permissions to allow one or more users to perform the operations identified at block 206. At block 210, the permissions generated at block 208 may be stored in the permissions database 122.

The flow diagram 200 may then return to block 202 or block 204. For example, returning to block 202, the model 116 may be re-trained at periodic time intervals. However, in some embodiments, the flow diagram 200 returns to block 204. Doing so allows the model 116 to generate, modify, or remove permissions database 122. For example, if the model 116 determines a user has high spending limits but often receives negative performance reviews, the model 116 may reduce the user's spending limits, and store indications of the reduced spending limits in the permissions database 122. Embodiments are not limited in these contexts.

FIG. 3 illustrates a graphical user interface 300, according to one embodiment. As shown, the graphical user interface 300 may be presented by the management application 114. An analysis section 302 of the graphical user interface 300 includes text generated by the model 116. As shown, the analysis section 302 indicates that the model 116 identified various trends in an organization, including that user group Y (which includes a plurality of users) completed transactions without manager approval on the last day of various quarters of the year and exceeded spending limits on 80% of transactions occurring on Mondays.

A recommendation section 304 includes one or more recommended permissions generated by the model 116. For example, as shown, the recommendation section 304 indicates the model generated permissions to remove the rules requiring manager approval for transactions performed by group Y on the last day of the quarter and increase spending limits for group Y on Mondays. A user may approve the submission of the generated permissions to the permissions database 122 using an approve element 306. Alternatively, the user may reject submission of the generated permissions to the permissions database 122 using a reject element 308. Embodiments are not limited in these contexts.

FIG. 4 illustrates an example logic flow 400 for automated system permissions management by learning access permissions, according to one embodiment. Although the example logic flow 400 depicts a particular sequence of operations, the sequence may be altered without departing from the scope of the present disclosure. For example, some of the operations depicted may be performed in parallel or in a different sequence that does not materially affect the function of the logic flow 400. In other examples, different components of an example device or system that implements the logic flow 400 may perform functions at substantially the same time or in a specific sequence.

According to some examples, the logic flow 400 includes accessing, by an application executing on a processor, a permissions database comprising permissions data for a plurality of accounts at block 402. For example, the management application 114 illustrated in FIG. 1 may access a permissions database 122 comprising permissions data for a plurality of accounts.

According to some examples, the logic flow 400 includes analyzing, by a large language model (LLM) executing on the processor based on the permissions database, a plurality of operations associated with the plurality of accounts at block 404. For example, the model 116 illustrated in FIG. 1 may analyze a plurality of operations associated with the plurality of accounts in the transaction data 118 and/or operation data 120.

According to some examples, the logic flow 400 includes determining, by the LLM based on the analysis, a first operation of the plurality of operations associated with a first account of the plurality of accounts at block 406. For example, the model 116 illustrated in FIG. 1 may determine, based on the analysis, a first operation of the plurality of operations associated with a first account of the plurality of accounts.

According to some examples, the logic flow 400 includes generating, by the LLM, based on the first operation and the permissions data for the first account, modified permissions data for the first account at block 408. For example, the model 116 illustrated in FIG. 1 may generate, based on the first operation and the permissions data for the first account, modified permissions data for the first account. The modified permissions data may include new permissions, removed permissions, modified permissions, and/or any combination thereof. The permissions database 122 may be updated by the management application 114 based on the modified permissions generated at block 408.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subject matter of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 501 referenced in FIG. 5A) may include a topography with a hidden layer 503 between an input layer 502 and an output layer 504. The input layer 502, having nodes commonly referenced in FIG. 5A as input nodes 505 for convenience, communicates input data, variables, matrices, or the like to the hidden layer 503, having nodes 506. The hidden layer 503 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 505 of the input layer, which then communicates the data to the hidden layer 503. The hidden layer 503 may be configured to determine the state of the nodes in the respective layers and assign weight coefficients or parameters of the nodes based on the edges separating each of the layers, e.g., an activation function implemented between the input data communicated from the input layer 502 and the output data communicated to the nodes 507 of the output layer 504. It should be appreciated that the form of the output from the neural network may generally depend on the type of model represented by the algorithm. Although the feedforward network 501 of FIG. 5A expressly includes a single hidden layer 503, other embodiments of feedforward networks within the scope of the descriptions can include any number of hidden layers. The hidden layers are intermediate the input and output layers and are generally where all or most of the computation is done. One or more feedforward networks 501 may be included in the model 116.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 508 in FIG. 5B. As in the basic feedforward network 501 of FIG. 5A, the illustrated example of FIG. 5B has an input layer 509 and an output layer 513. However where a single hidden layer 503 is represented in FIG. 5A, multiple consecutive hidden layers 510, 511, and 512 are represented in FIG. 5B. The edge neurons represented by white-filled arrows highlight that hidden layer nodes can be connected locally, such that not all nodes of succeeding layers are connected by neurons. One or more CNNs 508 may be included in the model 116.

FIG. 5C, representing a portion of the convolutional neural network 508 of FIG. 5B, specifically portions of the input layer 509 and the first hidden layer 510, illustrates that connections can be weighted. In the illustrated example, labels W1 and W2 refer to respective assigned weights for the referenced connections. Two hidden nodes 514 and 515 share the same set of weights W1 and W2 when connecting to two local patches.

Weight defines the impact a node in any given layer has on computations by a connected node in the next layer. FIG. 6 represents a particular node 600 in a hidden layer. The node 600 is connected to several nodes in the previous layer representing inputs to the node 600. The input nodes 601, 602, 603 and 604 are each assigned a respective weight W01, W02, W03, and W04 in the computation at the node 600, which in this example is a weighted sum. One or more nodes 600 may be included in the model 116.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network (RNN) is referenced as 700 in FIG. 7. As in the basic feedforward network 501 of FIG. 5A, the illustrated example of FIG. 7 has an input layer 710 (with nodes 712) and an output layer 740 (with nodes 742). However, where a single hidden layer 503 is represented in FIG. 5A, multiple consecutive hidden layers 720 and 730 are represented in FIG. 7 (with nodes 722 and nodes 732, respectively). As shown, the RNN 700 includes a feedback connector 704 configured to communicate parameter data from at least one node 732 from the second hidden layer 730 to at least one node 722 of the first hidden layer 720. It should be appreciated that two or more and up to all of the nodes of a subsequent layer may provide or communicate a parameter or other data to a previous layer of the RNN 700. Moreover and in some embodiments, the RNN 700 may include multiple feedback connectors 704 (e.g., connectors 704 suitable to communicatively couple pairs of nodes and/or feedback connectors 704 configured to provide communication between three or more nodes). Additionally or alternatively, the feedback connector 704 may communicatively couple two or more nodes having at least one hidden layer between them, i.e., nodes of nonsequential layers of the RNN 700. The model 116 may include one or more RNNs 700.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Referring now to FIG. 8 and some embodiments, an artificial intelligence (AI) program 802 may include a front-end network 804 and a back-end network 806. The artificial intelligence program 802 may be implemented on an AI processor 820, such as the processor 1004 of computer 1002 of FIG. 10, and/or a dedicated processing device. The instructions associated with the front-end network 804 (also referred to as an "algorithm" or "program") and the back-end network (also referred to as an "algorithm" or "program") 806 may be stored in an associated memory device and/or storage device of the system (e.g., storage device 1024 and/or memory 1006 of FIG. 10, etc.) communicatively coupled to the AI processor 820, as shown. Additionally or alternatively, the system may include one or more memory devices and/or storage devices (represented by memory 824 in FIG. 8) for processing use and/or including one or more instructions necessary for operation of the AI program 802. In some embodiments, the AI program 802 may include a deep neural network (e.g., a front-end network 804 configured to perform pre-processing, such as feature recognition, and a back-end network 806 configured to perform an operation on the data set communicated directly or indirectly to the back-end network 806). For instance, the front-end network 804 can include at least one CNN 808 communicatively coupled to send output data to the back-end network 806. In some embodiments, the model 116 includes the artificial intelligence program 802.

Additionally or alternatively, the front-end program 804 can include one or more AI algorithms 810, 812 (e.g., statistical models or machine learning programs such as decision tree learning, associate rule learning, recurrent artificial neural networks, support vector machines, and the like). In various embodiments, the front-end program 804 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 808 and/or AI algorithm 810 may be used for image recognition, input categorization, and/or support vector training. In some embodiments and within the front-end program 804, an output from an AI algorithm 810 may be communicated to a CNN 808 or 809, which processes the data before communicating an output from the CNN 808, 809 and/or the front-end program 804 to the back-end program 806. In various embodiments, the back-end network 806 may be configured to implement input and/or model classification, speech recognition, translation, and the like. For instance, the back-end network 806 may include one or more CNNs (e.g., CNN 814) or dense networks (e.g., dense networks 816), as described herein.

For instance, and in some embodiments of the AI program 802, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 804). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 802 may be trained using a semi-supervised learning process in which some but not all of the output data is known, e.g., a mix of labeled and unlabeled data having the same distribution.

In some embodiments, the AI program 802 may be accelerated via a machine learning framework 822 (e.g., hardware). The machine learning framework may include an index of basic operations, subroutines, and the like (primitives) typically implemented by AI and/or machine learning algorithms. Thus, the AI program 802 may be configured to utilize the primitives of the framework 822 to perform some or all of the calculations required by the AI program 802. Primitives suitable for inclusion in the machine learning framework 822 include operations associated with training a convolutional neural network (e.g., pools), tensor con volutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 9 is a flow chart representing a logic flow 900, according to at least one embodiment, of model development and deployment by machine learning. The logic flow 900 represents at least one example of a machine learning workflow in which operations are implemented in a machine-learning project. For example, the logic flow 900 may be used to train the model 116.

In block 902, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, block 902 can represent a starting point. However, with regard to continuing or improving an ongoing machine learning workflow, block 902 can represent an opportunity for further user input or oversight via a feedback loop.

In block 904, data is received, collected, accessed, or otherwise acquired and entered as can be termed data ingestion. In block 906, the data ingested in block 904 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing block 906 is updated with newly ingested data, an updated model will be generated. Block 906 can include data validation, which focuses on confirming that the statistics of the ingested data are as expected, such as that data values are within expected numerical ranges, that data sets are within any expected or required categories, and that data comply with any needed distributions such as within those categories. Block 906 can proceed to block 908 to automatically alert the initiating user, other human or virtual agents, and/or other systems, if any anomalies are detected in the data, thereby pausing or terminating the process flow until corrective action is taken.

In block 910, training test data such as a target variable value is inserted into an iterative training and testing loop. In block 912, model training, a core step of the machine learning workflow, is implemented. A model architecture is trained in the iterative training and testing loop. For example, features in the training test data are used to train the model based on weights and iterative calculations in which the target variable may be incorrectly predicted in an early iteration as determined by comparison in block 914, where the model is tested. Subsequent iterations of the model training, in block 912, may be conducted with updated weights in the calculations.

When compliance and/or success in the model testing in block 914 is achieved, process flow proceeds to block 916, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

FIG. 10 illustrates an example computing system 1000 suitable for implementing various embodiments as described herein. As shown, the computing system 1000 comprises a computer 1002, which is representative of any type of physical and/or virtualized computing device. Examples of the computer 1002 include, but are not limited to, a server, workstation, laptop, mobile device, smartphone, tablet computer, mainframe, distributed computing system, compute cluster, media device, camera, gaming device, a portable digital assistant (PDA), a system-on-chip (SoC), a pager, a television, a wearable device, a virtual machine (VM), or any other device with processing capabilities. In one embodiment, the computer 1002 is representative of some or all of the components of the user devices 102, servers 106, and/or computing devices 104 of FIG. 1. More generally, the computing system 1000 is configured to implement all systems, methods, apparatuses, media, and embodiments disclosed herein.

As shown, the computer 1002 includes one or more processors 1004, one or more memories 1006, one or more non-transitory storage media 1010, one or more communications interfaces 1012, one or more positioning devices 1014, one or more input devices 1016, and one or more output devices 1018 communicably coupled via an interconnect 1008. A power source 1020, such as a power supply, battery, or any type of power source may provide power to the computer 1002.

The processor 1004 is representative of any type of processing circuit. For example, the processor 1004 may be a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, a digital signal processor, analog to digital converter, digital to analog converter, and the like.

The memory 1006 is representative of any computer readable medium to store data, code, or other information. The memory 1006 may include volatile memory, such as volatile Random Access Memory (RAM) including a cache area for the temporary storage of data. The memory 1006 may also include non-volatile memory, which can be embedded and/or may be removable. The non-volatile memory can additionally or alternatively include an electrically erasable programmable read-only memory (EEPROM), flash memory or the like. The storage medium 1010 is representative of any type of computer readable medium to store data, code, or other information. Examples of storage media 1010 include solid state drives, hard drives, Redundant Array of Independent Disks (RAID) drives, memory pools, USB storage devices, and the like.

The memory 1006 and storage medium 1010 can store any number and type of computer-executable instructions executed by the processor 1004 to implement the functions of the computer 1002 described herein. For example, the memory 1006 may include such applications as a web browser application and/or a mobile P2P payment system client application. These applications also typically provide a graphical user interface (GUI) on a display that allows the user to communicate with the computer 1002, and, for example a mobile banking system, and/or other devices or systems. In one embodiment, when the user decides to enroll in a mobile banking program, the user downloads or otherwise obtains the mobile banking system client application from a mobile banking system, or from a distinct application server. In other embodiments, the user interacts with a mobile banking system via a web browser application in addition to, or instead of, the mobile P2P payment system client application. Similarly, the memory 1006 and/or storage medium 1010 may be used to store data such as cached data, files for user accounts, user profiles, account balances, transaction histories, files downloaded or received from other devices, and any other data items.

The interconnect 1008 is representative of any type of circuitry to connect the components of the computer 1002. For example, the interconnect 1008 can include or represent, a system bus, a universal serial bus (USB) interface, a peripheral component interconnect (PCI), a Peripheral Component Interconnect-enhanced (PCIe), compute express link (CXL) interconnects, Universal Chiplet Interconnect Express (UCIe) interface, PCI-UCIe interconnects, an interface serial peripheral interconnects (SPIs), integrated interconnects (I2Cs), a high-speed interface connecting the processor 1004 to the memory 1006, individual electrical connections among the components, and electrical conductive traces on a motherboard common to some or all of the above-described components of the computer 1002. As discussed herein, the interconnect 1008 may operatively couple various components with one another, or in other words, electrically connects those components, either directly or indirectly—by way of intermediate component(s)—with one another.

The one or more input devices 1016 are representative of any type of input device for receiving input, such as a keypad, keyboard, touchscreen, touchpad, microphone, camera, fingerprint sensor, mouse, joystick, other pointer device, button, soft key, and the like. The one or more output devices 1018 are representative of any type of device for outputting information, such as a monitor, speaker, haptic feedback module, printer, and the like.

The computer 1002 may use the communications interface 1012 to communicate with one or more other devices 1024 via a network 1022. The communications interface 1012 allows the computer 1002 to communicate with and conduct transactions with other devices and systems, such as the other devices 1024. The communications interface 1012 may be a wired and/or a wireless interface. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communications interface 1012, which can be or include a radio-frequency transceiver, a Bluetooth device, Wi-Fi device, a Near-Field Communication (NFC) device, and other wireless transceivers. In addition, a positioning device 1014 such as a Global Positioning System (GPS) device may be included for navigation and location-related data exchanges, ingoing and/or outgoing. Wi-Fi networks use radio technologies called IEEE 802.11x (a, b, g, n, ac, ax, etc.) to provide secure, reliable, fast wireless connectivity. A Wi-Fi network connects computers to each other, to the Internet, and to wired networks (which use IEEE 802.3-related media and functions). Communications may also and/or alternatively be conducted via wired connections using the communications interface 1012, e.g., using USB, Ethernet, and other physically connected modes of data transfer. The network 1022 may be any one of, or the combination of, wired and/or wireless networks including without limitation a direct connection, a private network (e.g., an intranet), a public network (e.g., the Internet), a Personal Area Network (PAN), a Local Area Network (LAN), a Wide Area Network (WAN), a wireless network, a cellular network, and other communications networks.

The computer 1002 is configured to use the communications interface 1012 as, for example, a network interface to communicate with one or more other devices on a network such as network 1022. In this regard, the computer 1002 utilizes the wireless communications interface 1012 as an antenna operatively coupled to a transmitter and a receiver (together a "transceiver") included with the communications interface 1012. The communications interface 1012 is configured to provide signals to and receive signals from the transmitter and receiver, respectively. The signals may include signaling information in accordance with the air interface standard of the applicable cellular system of a wireless telephone network. In this regard, the computer 1002 may be configured to operate with one or more air interface standards, communication protocols, modulation types, and access types. By way of illustration, the computer 1002 may be configured to operate in accordance with any of a number of first, second, third, fourth, fifth-generation communication protocols and/or the like. For example, the as a smartphone, the computer 1002 be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The computer 1002 may also be configured to operate in accordance with non-cellular communication mechanisms, such as via a wireless local area network (WLAN) or other communication/data networks.

The communications interface 1012 may also include a payment network interface. The payment network interface may include software, such as encryption software, and hardware, such as a modem, for communicating information to and/or from one or more devices on a network. For example, the computer 1002 may be configured so that it can be used as a credit or debit card by, for example, wirelessly communicating account numbers or other authentication information to a terminal of the network. Such communication could be performed via transmission over a wireless communication protocol such as the NFC protocol.

The computer 1002 may be under the control of any suitable operating system (not pictured). Example operating systems include, but are not limited to, Linux® operating systems, UNIX®, Windows® operating systems, macOS®, iOS®, Android® and any other type of operating system.

The computer 1002 as illustrated diagrammatically represents at least one example of a possible implementation, where alternatives, additions, and modifications are possible for performing some or all of the described methods, operations and functions. Although shown separately, in some embodiments, two or more computers 1002, systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

Aspects of the present disclosure are described herein with reference to flowchart illustrations and/or block diagrams of computer-implemented methods and computing systems according to embodiments of the disclosure. It will be understood that each block of the flowchart illustrations and/or block diagrams, and combinations of blocks in the flowchart illustrations and/or block diagrams, can be implemented by computer readable program instructions that may be provided to a processor of a computer or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present disclosure and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of one or more aspects of the disclosure and the practical application, and to enable others of ordinary skill in the art to understand one or more aspects of the disclosure for various embodiments with various modifications as are suited to the particular use contemplated.

What is claimed is:

1. A method, comprising:

accessing, by an application executing on a processor, a permissions database comprising permissions data for a plurality of accounts;

accessing, by the application, an operation database comprising a plurality of metadata attributes of a plurality of operations initiated by the plurality of accounts, wherein the plurality of metadata attributes comprise a respective time of the respective operation;

analyzing, by a large language model (LLM) executing on the processor, the metadata attributes and the plurality of operations;

determining, by the LLM based on the analysis, a first operation of the plurality of operations initiated by a first account of the plurality of accounts, wherein the permissions data of the first account restrict the first account from performing the first operation during a first time interval of a plurality of time intervals; and generating, by the LLM, based on the first operation, the metadata attributes the plurality of operations, and the permissions data for the first account, modified permissions data for the first account comprising a grant of permissions to perform the first operation during the first time interval.

2. The method of claim 1, wherein the plurality of metadata attributes further comprise: a type of the operation, a permissions level required to perform the operation, and at least one of the plurality of accounts associated with initiating the operation.

3. The method of claim 1, further comprising:

storing, by the application, the modified permissions data for the first account in the permissions database.

4. The method of claim 3, further comprising prior to storing the modified permissions data in the permissions database:

outputting, by the application, an indication of the modified permissions data; and receiving, by the application, an indication of acceptance of the modified permissions data.

5. The method of claim 1, wherein the LLM is trained based on training data comprising at least a portion of the permissions database and at least a portion of an operations database.

6. A non-transitory computer-readable storage medium, the computer-readable storage medium including instructions that when executed by a processor, cause the processor to:

access, by an application, a permissions database comprising permissions data for a plurality of accounts;

access, by the application, an operation database comprising a plurality of metadata attributes of a plurality of operations initiated by the plurality of accounts, wherein the plurality of metadata attributes comprise a respective time of the respective operation;

analyze, by a large language model (LLM), the metadata attributes and the plurality of operations;

determine, by the LLM based on the analysis, a first operation of the plurality of operations initiated by a first account of the plurality of accounts, wherein the permissions data of the first account restrict the first account from performing the first operation during a first time interval of a plurality of time intervals; and generate, by the LLM, based on the first operation, the metadata attributes the plurality of operations, and the permissions data for the first account, modified permissions data for the first account comprising a grant of permissions to perform the first operation during the first time interval.

7. The computer-readable storage medium of claim 6, wherein the plurality of metadata attributes further comprise: a type of the operation, a permissions level required to perform the operation, and at least one of the plurality of accounts associated with initiating the operation.

8. The computer-readable storage medium of claim 6, wherein the instructions further cause the processor to:

store, by the application, the modified permissions data for the first account in the permissions database.

9. The computer-readable storage medium of claim 8, wherein the instructions further cause the processor to prior to storing the modified permissions data in the permissions database:

output, by the application, an indication of the modified permissions data; and receive, by the application, an indication of acceptance of the modified permissions data.

10. The computer-readable storage medium of claim 6, wherein the LLM is trained based on training data comprising at least a portion of the permissions database and at least a portion of an operations database.

11. An apparatus, comprising:

a processor; and a memory storing instructions that, when executed by the processor, cause the processor to:

access, by an application, a permissions database comprising permissions data for a plurality of accounts;

access, by the application, an operation database comprising a plurality of metadata attributes of a plurality of operations initiated by the plurality of accounts, wherein the plurality of metadata attributes comprise a respective time of the respective operation;

analyze, by a large language model (LLM), the metadata attributes and the plurality of operations associated with the plurality of accounts;

determine, by the LLM based on the analysis, a first operation of the plurality of operations associated with a first account of the plurality of accounts, wherein the permissions data of the first account restrict the first account from performing the first operation during a first time interval of a plurality of time intervals; and generate, by the LLM, based on the first operation, the metadata attributes the plurality of operations, and the permissions data for the first account, modified permissions data for the first account comprising a grant of permissions to perform the first operation during the first time interval.

12. The apparatus of claim 11, wherein the plurality of metadata attributes further comprise: a type of the operation, a permissions level required to perform the operation, and at least one of the plurality of accounts associated with initiating the operation.

13. The apparatus of claim 11, wherein the instructions further cause the processor to:

store, by the application, the modified permissions data for the first account in the permissions database.

14. The apparatus of claim 13, wherein the instructions further cause the processor to prior to storing the modified permissions data in the permissions database:

output, by the application, an indication of the modified permissions data; and receive, by the application, an indication of acceptance of the modified permissions data.

15. The method of claim 1, further comprising:

receiving, by the application from the first account, a request to perform the first operation during the first time interval; and approving, by the application, the request based on the modified permissions data for the first account.

16. The method of claim 15, further comprising:

accessing, by the application, an organizational database comprising events associated with an organization, wherein the LLM analyzes the organizational database, wherein the LLM further generates the modified permissions data based on the organizational database.

17. The method of claim 16, wherein the LLM is trained based on training data including the permissions database, the operation database, a transaction database, and the organizational database.

18. The method of claim 17, wherein the transaction database comprises a log of transactions performed by the organization, wherein at least one of the transactions is initiated by at least one of the operations.

19. The method of claim 18, wherein the modified permissions data modifies a numerical threshold associated with the first operation during the first time interval from a first threshold value to a second threshold value, the second threshold value greater than the first threshold value.

20. The method of claim 19, wherein the plurality of operations comprise previously initiated operations.

* * * * *